United States Patent
Chene et al.

(10) Patent No.: US 9,284,033 B2
(45) Date of Patent: Mar. 15, 2016

(54) METHOD AND DEVICE FOR STEERING A SEISMIC VESSEL, ON THE BASIS OF BOUNDARIES OF BINNING COVERAGE ZONES

(71) Applicant: SERCEL, Carquefou (FR)

(72) Inventors: Fabien Chene, Guerande (FR); Sandrine Boudon, Nantes (FR)

(73) Assignee: SERCEL, Carquefou (FR)

( * ) Notice: Subject to any disclaimer, the term of this patent is extended or adjusted under 35 U.S.C. 154(b) by 0 days.

(21) Appl. No.: 14/586,175

(22) Filed: Dec. 30, 2014

(65) Prior Publication Data

US 2015/0183502 A1    Jul. 2, 2015

(30) Foreign Application Priority Data

Dec. 31, 2013  (EP) .................................. 13306904

(51) Int. Cl.
*B63H 25/04*    (2006.01)
*G01V 1/38*    (2006.01)
*G01C 21/00*    (2006.01)
*G05D 1/02*    (2006.01)

(52) U.S. Cl.
CPC ............... *B63H 25/04* (2013.01); *G01C 21/00* (2013.01); *G01V 1/3808* (2013.01); *G05D 1/0206* (2013.01)

(58) Field of Classification Search
USPC .......................................................... 701/21
See application file for complete search history.

(56) References Cited

U.S. PATENT DOCUMENTS

| 5,910,789 | A  | * | 6/1999  | Vigen ................... | G01S 5/0063 342/357.45 |
|---|---|---|---|---|---|
| 7,162,967 | B2 | * | 1/2007  | Hillesund ............... | B63B 21/66 114/344 |
| 7,944,774 | B2 | * | 5/2011  | Monk ................... | G01V 1/3808 181/101 |
| 8,391,101 | B2 | * | 3/2013  | Brewer ................... | G01V 1/38 367/16 |
| 8,854,918 | B2 | * | 10/2014 | Toennessen ......... | G01V 1/3826 114/246 |
| 8,897,938 | B2 | * | 11/2014 | Fjellstad .............. | G01V 1/3826 701/21 |
| 8,902,696 | B2 | * | 12/2014 | Toennessen ............ | B63B 21/66 114/244 |

(Continued)

OTHER PUBLICATIONS

European Search Report and Written Opinion dated May 13, 2014 for corresponding European Patent Application No. 13306904.7 (6 pages).

*Primary Examiner* — Thomas Tarcza
*Assistant Examiner* — Alex C Dunn
(74) *Attorney, Agent, or Firm* — David D. Brush; Westman, Champlin & Koehler, P.A.

(57) ABSTRACT

It is proposed a method for steering a seismic vessel associated with a sail line and a current preplot line. The seismic vessel tows at least one acoustic linear antenna including receivers, the receivers receiving signals generated by at least one source and reflected by subsurface's layers at a plurality of reflexion points. The method includes: a) computing distances $d_i$, $i \in \{1 \ldots n\}$, from n reflexion points, included in the plurality of reflexion points, to a boundary of an already obtained binning coverage zone associated with an already used previous preplot line; b) computing a distance D, from the n reflexion points to n target reflexion points, as a function of the distances $d_i$; and c) providing steering information comprising or based on the distance D to a navigation system or to an operator of a navigation system, to alter the course of the seismic vessel.

14 Claims, 7 Drawing Sheets

(56) References Cited

U.S. PATENT DOCUMENTS

| | | | |
|---|---|---|---|
| 8,976,622 B2* | 3/2015 | Hillesund | G01V 1/3826 367/16 |
| 2004/0230379 A1 | 11/2004 | Houck et al. | |
| 2007/0165486 A1 | 7/2007 | Moldoveanu et al. | |
| 2009/0279388 A1* | 11/2009 | Monk | G01V 1/3808 367/21 |
| 2009/0310439 A1* | 12/2009 | Hauan | G01V 1/3835 367/21 |
| 2010/0118645 A1* | 5/2010 | Welker | B63B 21/66 367/17 |
| 2013/0051175 A1 | 2/2013 | Boberg et al. | |
| 2013/0155805 A1 | 6/2013 | Tonchia | |
| 2013/0294194 A1* | 11/2013 | Pritchard | G01V 1/3808 367/17 |
| 2015/0085609 A1* | 3/2015 | Hillesund | G01V 1/3826 367/16 |

\* cited by examiner

METHOD AND DEVICE FOR STEERING A SEISMIC VESSEL, ON THE BASIS OF BOUNDARIES OF BINNING COVERAGE ZONES

1. FIELD OF THE DISCLOSURE

The field of the disclosure is that of geophysical data acquisition.

More precisely, the disclosure relates to marine seismic acquisition involving one or several vessels to achieve an imaging of the seabed earth crust.

In particular, the disclosure relates to a technique for steering a seismic vessel associated with sail lines and preplot lines (also referred to as "track lines") which are often the same than the sail lines (the terms "sail line" and "preplot line" are defined below). The seismic vessel tows at least one acoustic linear antenna comprising receivers. The receivers receive signals generated by at least one source and reflected by the subsurface's layers at reflexion points.

In other words, the disclosure concerns a steering technique applicable to a seismic vessel, and is used to perform an efficient coverage over a survey area. The disclosure is to be used typically in 3D surveys.

The present disclosure can be applied notably to the oil exploration industry, but may also be applied to any field using a geophysical data acquisition network in a marine environment.

2. TECHNOLOGICAL BACKGROUND

The main purpose of an exploration (e.g. offshore oil exploration) over a survey is to cover its underlying area.

As shown in FIG. 1, to ensure this goal is achieved, the area is divided into small areas called bins 2. These bins are virtually located at the bottom of the sea, and the purpose is to hit them through various kinds of reflected waves 8. These waves are captured by receivers (hydrophones) 3 that are part of different source-receiver offset classes, also referred to as "offset classes" (see vertical lines referenced 4, symbolizing the separators between offset classes). A source-receiver offset is an offset distance between source and receiver. The offset classes can possibly be one of the following: "near offsets", "near-mid offsets", "mid-far offsets", "mid offsets", "far offsets", ... , depending on the receiver location along the streamer (linear antennas) 7 towed by the seismic vessel 6. Each bin 2 shall be hit enough through these offset classes, according to the client specification, so that the coverage can be considered correct. In fact, the wave 8 starts from the source 5, and ends at a receiver 3 after bouncing on a reflexion point 1, at the bottom of the sea (more precisely, the wave is reflected by the subsurface's layers, at a reflexion point 1). Thus, a bin 2 is considered hit when the reflexion point 1 falls into it.

Operationally, as shown in FIG. 2, the survey is discretized into preplot lines 24, 25, 26, etc. A preplot line is an arbitrary geometric curve, and can be therefore a straight line, a broken line, a circle, an ellipsoid, or something else that can be mathematically expressed through an equation of the type $f(x,y)=0$. Those preplot lines are positioned on the survey area in such a way that following all of them with a null steering offset (see definition below) and the streamers 7 perfectly aligned behind the vessel 6, would result in a perfect global coverage (a part of which corresponds to each of the preplot lines). In FIG. 2, the binning coverage zones referenced 21, 22 and 23 are associated with the preplot lines referenced 24, 25 and 26 respectively. Being able to steer with a null steering offset and getting streamers perfectly aligned behind the vessel is in practice impossible, mainly because of currents. In practice, preplot lines are contiguously shot so that one can adjust the vessel position to juxtapose the binning coverage zone associated with a given preplot line with the binning coverage zone associated with the adjacent preplot line(s).

In operation, the lines along which the vessel actually sails are called "sail lines". The sail lines are generally the preplot lines, but can be different in some rare cases, e.g. if the vessel must avoid an obstacle located on a preplot line (oil platform, FPSO unit ("floating production, storage and offloading unit"), etc).

In practice, the navigation system (also referred to as INS, for "Integrated Navigation System"), which is onboard the vessel, typically receives two control settings:
 the steering offset (also referred to as "desired track offset" or DTO), which is the desired offset between the sail line and the vessel; and
 a distance DC, which is the current distance from the sail line to the vessel position.

Within the navigation system, these control settings are usually used by an autopilot system (e.g. Robtrack) which determines how to alter the seismic vessel course so that the vessel reaches a new position in which the steering offset (DTO) is respected.

In a first known solution, this operation of juxtaposition is manually done aboard, by using the information given by a binning software. For the navigator (human operator), the usual process is to watch the binning software screen, spot holes (e.g. 27) in the coverage (i.e. holes between adjacent binning coverage zones) by scanning the colours, possibly anticipatively, and to adjust the vessel course accordingly. In practice, the steering offset (DTO) is constantly adjusted (visually) by the human operator.

A main drawback of the first known solution is that steering the vessel to juxtapose the binning coverage zone associated with a preplot line with the binning coverage zone associated with the contiguous preplot line(s) implies that navigators (human operators) must constantly adjust their steering offset by taking the information of the binning software, from the binning offset classes considered. Doing so manually is suboptimal and is very difficult to achieve even for an experienced user.

Another drawback of the first known solution is an excessive steering caused by the motivation of juxtaposing the coverage. Overdoing it often results in a too dynamic line, difficult to mimic in case of a future 4D survey based on the current one. For information, a 4D acquisition well known in the field of seismic is to repeat later a 2D or 3D acquisition, in order to analyze the changes between two periods. Typically to monitor a reservoir.

A second known solution (more recent practice) is to maintain a null steering offset with regards to the preplot line.

A main drawback of the second known solution is that setting a null steering offset indeed facilitates the 4D survey to come, but will result in a poor global coverage.

3. SUMMARY

A particular embodiment of the disclosure proposes a method for steering a seismic vessel associated with a sail line, characterized in that it comprises:
a) computing distances $d_i$, i∈{1 ... n}, from n reflexion points to a boundary of a binning coverage zone associated with a previous preplot line;

b) computing a distance D, from said n reflexion points to n target reflexion points, as a function of said distances $d_i$; and c) providing steering information comprising or based on the distance D to a navigation system or to an operator of a navigation system, to alter the course of the seismic vessel.

This particular embodiment relies on a wholly novel and inventive approach. Indeed, the idea (general principle) is to provide a way of juxtaposing two binning coverage zones (one associated with a current preplot line and the other with a previous preplot line), by controlling the vessel using as input n reflexion points positions and the binning boundary of the previous preplot line. A previous preplot line is a preplot line which has already been used and for which a binning coverage zone has been obtained and is known.

To achieve this, the distances $d_i$ are computed, then the distance D is computed, and this distance D is used to alter the seismic vessel course. Thus, after the vessel has actually made a lateral shift of D while advancing, it will be in the correct position and the two binning coverage zones (one associated with the current preplot line and the other with the previous preplot line) will be juxtaposed.

The proposed solution is very simple and can be performed automatically, without requiring any intervention of a human operator (navigator).

According to a particular feature, said previous preplot line is adjacent to a current preplot line.

Thus the proposed solution can be used iteratively, for each new current preplot line, in order to perform an efficient global coverage.

According to a particular feature, said n reflexion points are reflexion points associated with an external acoustic linear antenna, which is the closest acoustic linear antenna to said boundary among a plurality of acoustic linear antennas towed by said seismic vessel.

Thus the juxtaposition of the aforesaid two binning coverage zones is improved.

According to a particular feature, said distances $d_i$ are directed distances having a positive value when said boundary is on the right of the reflexion points when considering the direction of the sail line, and in that said distance D is a constant directed distance having a positive value when the target reflexion points are on the right of the reflexion points when considering the direction of the sail line, and so that a function f(X) is minimal, with $X=\{x_1, \ldots, x_n, D\}$, said distance D being defined as: $D=x_i+d_i$, $i \in \{1 \ldots n\}$ and, each of the distances $x_i$ being a directed distance from said boundary to one of the n target reflexion points, having a positive value when said target reflexion point is on the right of said boundary when considering the direction of the sail line.

Thus the juxtaposition of the aforesaid two binning coverage zones is optimized.

According to a particular feature, the function f(X) is defined as:

$$f: X \to \frac{1}{2}x^T \cdot x + \frac{1}{2}\varepsilon \cdot D^2,$$

with $x=\{x_1, \ldots, x_n\}$ and $\varepsilon$ a reduction coefficient minimizing the influence of $D^2$.

Thus, the proposed solution allows to reduce the number of calculations.

According to a particular feature, the value of X, referred to as result $X_r$, which minimizes f(X) is computed in step b) as: $X_r = C^{-1}A^T(AC^{-1}A^T)^{-1}d$, with:

d a column matrix comprising the distances $d_i$, $i \in \{1 \ldots n\}$;

C a matrix (n+1,n+1) comprising: an identity matrix $I_n$, a (n+1)th line comprising n zeroes then $\varepsilon$, and a (n+1)th column comprising n zeroes then $\varepsilon$; and A a matrix (n,n+1) such that: AX=d, i.e. A defining n constraints: $-x_i+D=d_i$, $i \in \{1 \ldots n\}$ and comprising: an identity matrix $I_n$ multiplied by $-1$, and a (n+1)th column comprising n ones.

Thus, the proposed solution is easy to implement

According to a particular feature, at least one additional constraint is set, of the form $x_i \le k$ or $x_i \ge K$, k and K being arbitrary real numbers, and said step b) comprises the following supplemental steps:

verifying that the distances $x_i$ comprised in the result $X_r$ satisfy said at least one additional constraint;

if said at least one additional constraint is satisfied by the distances $x_i$ comprised in the result $X_r$, $X_r$ is retained as final result;

if said at least one additional constraint is not satisfied by at least one of the distances $x_i$ comprised in the result $X_r$:

for each additional constraint, selecting one of the distances $x_i$, which does not satisfy said additional constraint;

for each additional constraint, adding a supplemental line in said matrix A, which thus becomes A', each supplemental line describing an equality constraint $x_i=k$ or $x_i=K$ corresponding to said additional constraint for the selected one of the distances $x_i$;

computing a final result $X'_r$ defined as: $X'_r=A'^{-1}d$ if A' is squared, or $X'_r=(A'^T C^{-1}A')^{-1}A'^T C^{-1}d$ if A' has more rows than columns.

Thus it is possible to specify a constraint on the number of bins under-covered (with a constraint of the form $x_i \ge K$) or over-covered (with a constraint of the form $x_i \le k$).

According to a particular feature, if the additional constraint is of the form $x_i \ge K$, the selected one of the distances $x_i$ is the one having an index i corresponding to max(di), and, if the additional constraint is of the form $x_i \le k$, the selected one of the distances $x_i$ is the one having an index i corresponding to min(di).

According to a particular feature, the steering information comprise:

a directed distance DC from the sail line to a current position of the seismic vessel, having a positive value when the seismic vessel is on the right of the sail line, when considering the direction of the sail line; and a desired track offset DTO, which is a directed distance from the sail line to a desired position of the seismic vessel, having a positive value when the seismic vessel is on the right of the sail line when considering the direction of the sail line, DTO being defined as follows: DTO=DC+D.

Thus the proposed solution can be used with a navigation system which typically receives two control settings: the steering offset (DTO) and the distance DC.

In a first implementation, said n reflexion points are reflexion points associated with an acoustic linear antenna towed by said seismic vessel and comprising receivers, said receivers receiving signals generated by at least one source and reflected by subsurface's layers of the sea at said n reflexion points. The receivers are divided in a plurality of offset classes. Said steps a) and b) are carried out for at least two offset classes of said plurality, a distance D being computed for each offset class. The method comprises a step b') of computing a final distance $D_f$ on the basis of the distances D computed for said at least two offset classes. In said step c) the steering information comprise, or are based, on the final distance $D_f$.

Thus several (and possibly all) the offset classes are taken into account. The process is customizable by the user.

In a second implementation, said steps a) and b) are carried out for at least two previous preplot lines, a distance D being computed for each previous preplot line. The method comprises a step b") of computing a resulting distance $D_r$ on the basis of the distances D computed for said at least two previous preplot lines. In said step c) the steering information comprise, or are based, on the resulting distance $D_r$.

Thus several previous preplot lines are taken into account.

In a third implementation, for each of said for at least two previous preplot lines:
  said steps a) and b) are carried out for each of said at least two offset classes, and
  said step b') is carried out, enabling to output the final distance $D_f$ on the basis of the distances D computed for said at least two offset classes,
and in said step b"), the resulting distance $D_r$ is computed on the basis of the final distance $D_f$ computed for said at least two previous preplot lines.

This third implementation combines the aforesaid first and second implementations. Thus several offset classes and several previous preplot lines are taken into account.

In another embodiment, the disclosure pertains to a computer program product comprising program code instructions for implementing the above-mentioned method (in any of its different embodiments) when said program is executed on a computer or a processor.

In another embodiment, the disclosure pertains to a non-transitory computer-readable carrier medium, storing a program which, when executed by a computer or a processor causes the computer or the processor to carry out the above-mentioned method (in any of its different embodiments).

In another embodiment, the disclosure pertains to a device for steering a seismic vessel associated with a sail line, comprising:
  means for computing distances $d_i$, $i \in \{1 \ldots n\}$, from n reflexion points to a boundary of a binning coverage zone associated with a previous preplot line;
  means for computing a distance D, from said n reflexion points to n target reflexion points, as a function of said distances $d_i$; and
  means for providing steering information comprising or based on the distance D to a navigation system or to an operator of a navigation system, to alter the course of the seismic vessel.

Advantageously, the device comprises means for implementing the steps it performs in the method for steering as described above, in any of its various embodiments.

4. LIST OF FIGURES

Other features and advantages of embodiments of the disclosure shall appear from the following description, given by way of an indicative and non-exhaustive examples and from the appended drawings, of which:

FIG. 1, already discussed in relation to the prior art, illustrates the notions of bin, reflexion point and offset classes;

FIG. 2, already discussed in relation to the prior art, illustrates the notions of preplot line and associated binning coverage zone;

Figure 6B:
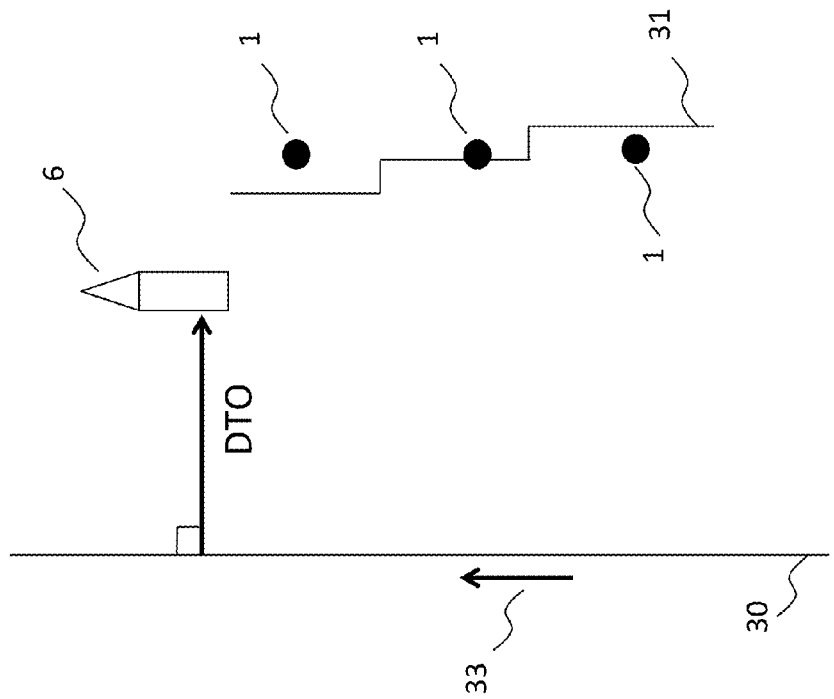
Figure 6A:
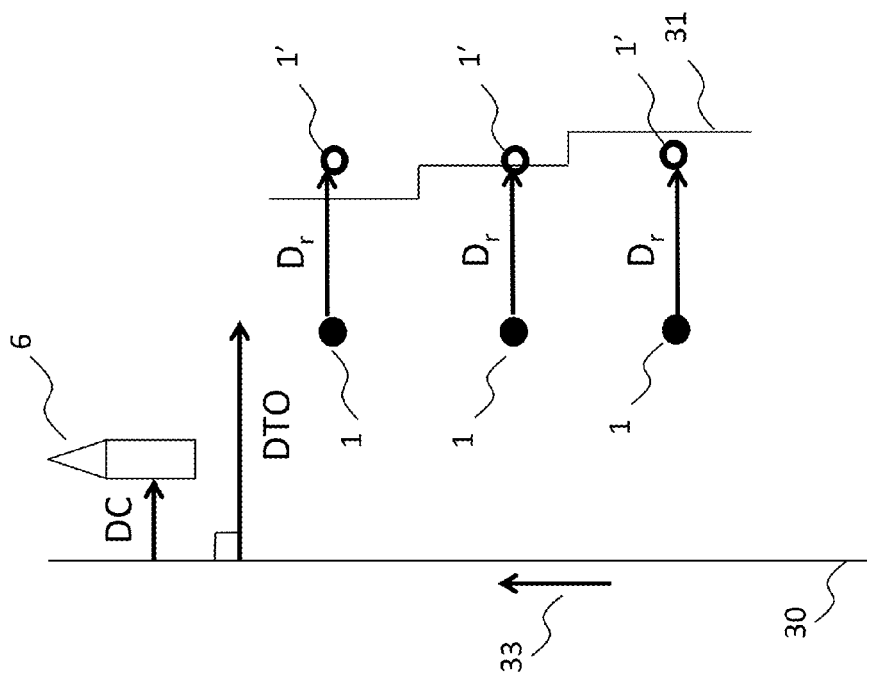
Figure 7A:
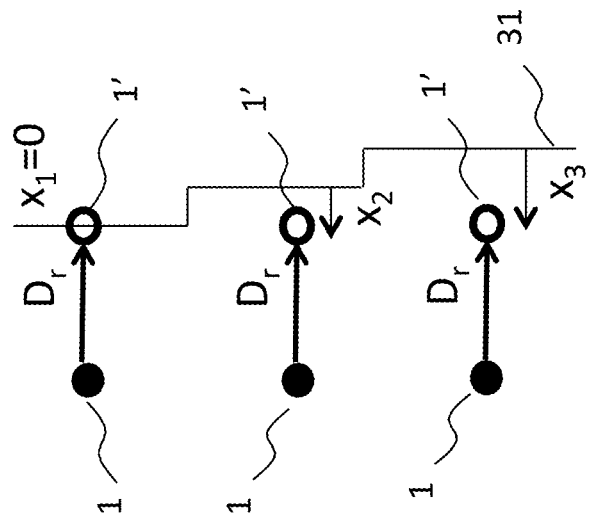
Figure 7B:
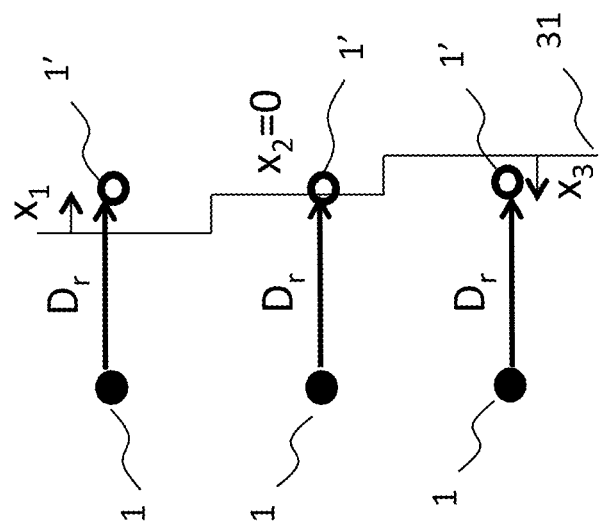

FIGS. 6A and 6B show a vessel before (FIG. 6A) and after (FIG. 6B) modification of the course of the vessel, according to the proposed solution; and FIGS. 7A and 7B illustrate the difference between a case without use of an additional constraint (FIG. 7A) and a case with use of an additional constraint (FIG. 7B), this additional constraint preventing some bins to be over-covered, in a particular embodiment of the method according to the disclosure.

5. DETAILED DESCRIPTION

In all of the figures of the present document, identical elements and steps are designated by the same numerical reference sign.

Figure 4:
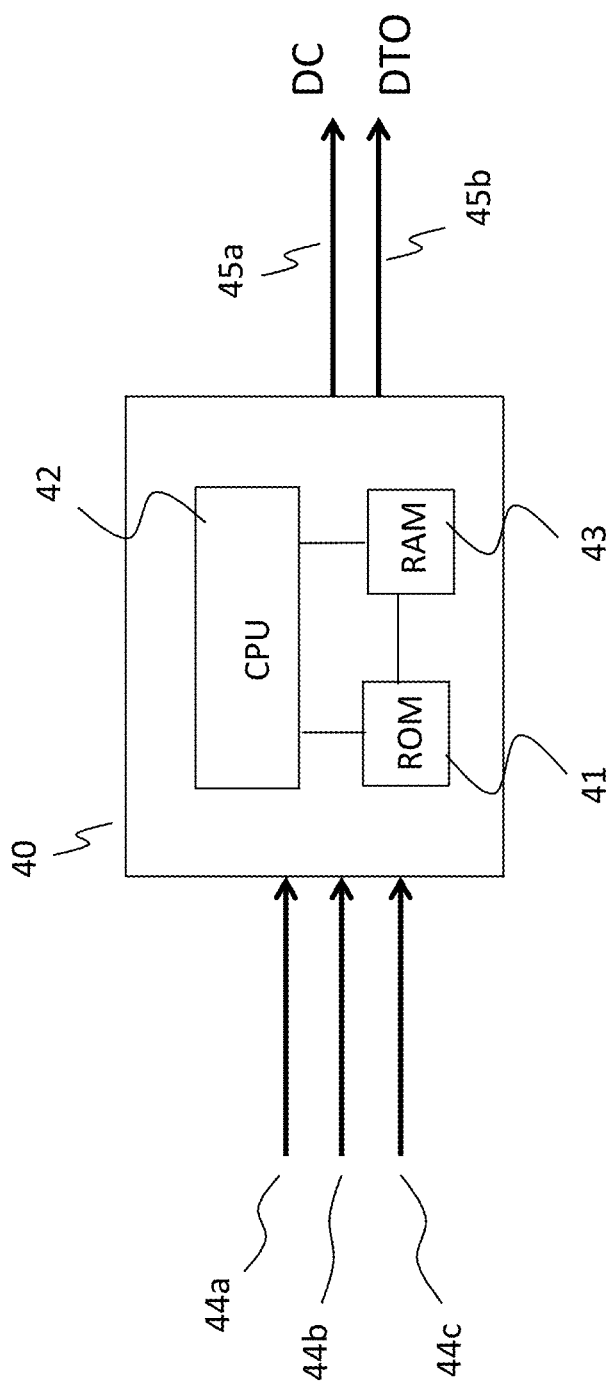
FIG. 4 shows the simplified structure of a device according to a particular embodiment of the disclosure.
Figure 5:
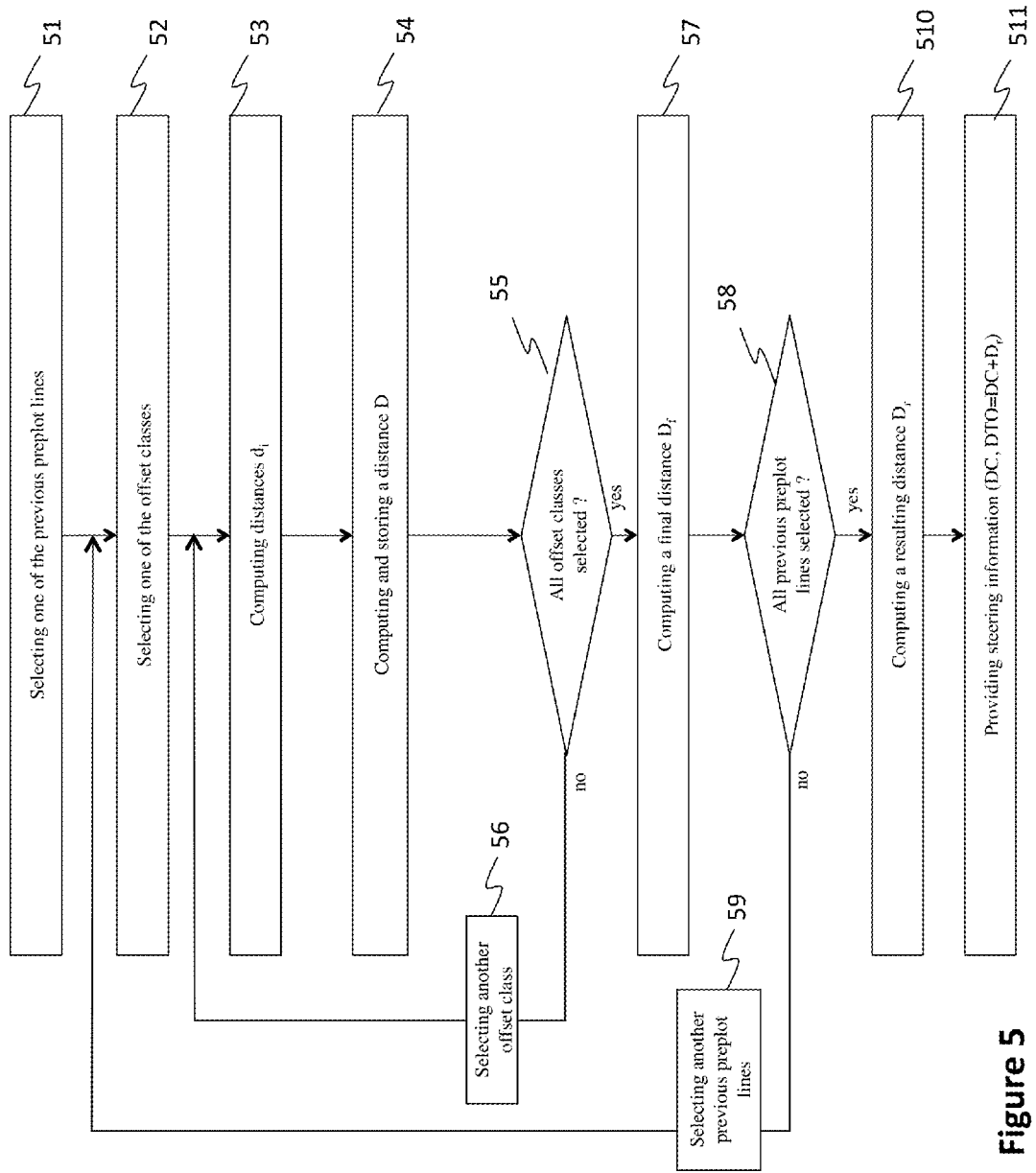
FIG. 5 is a flowchart of a particular embodiment of the method according to the disclosure.

Referring now to FIG. 5, we present a steering method according to a particular embodiment of the disclosure. This method is carried out by a device (for more details about this device, see below description of FIG. 4).

Figure 1:
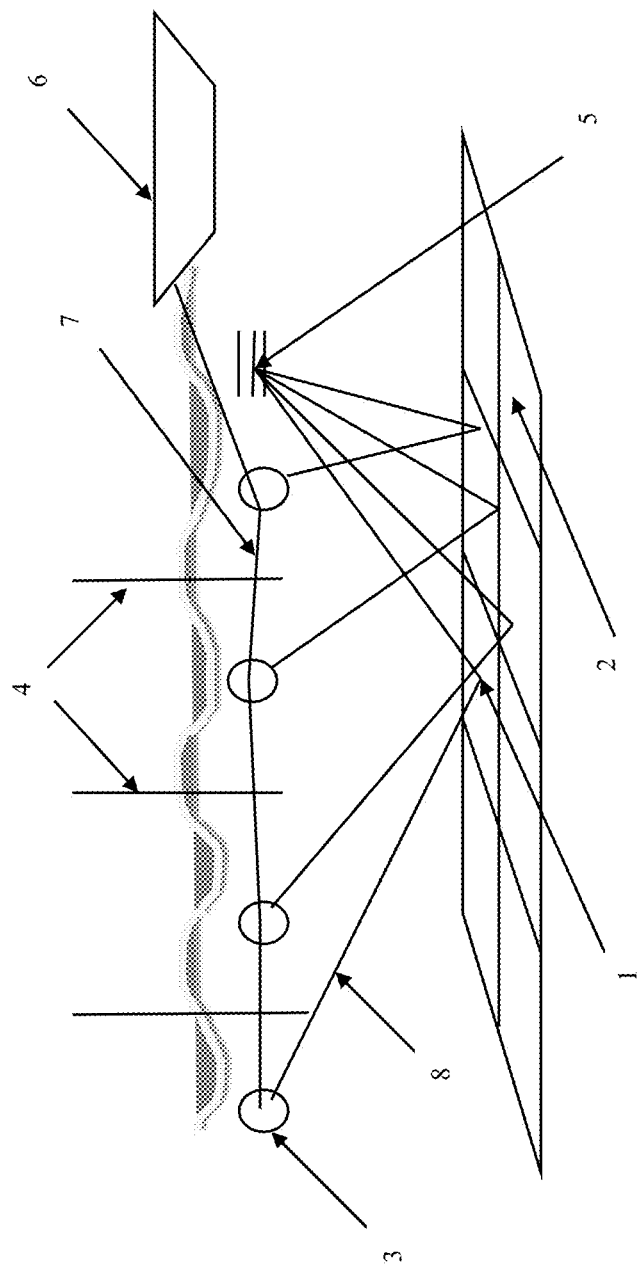
Figure 2:
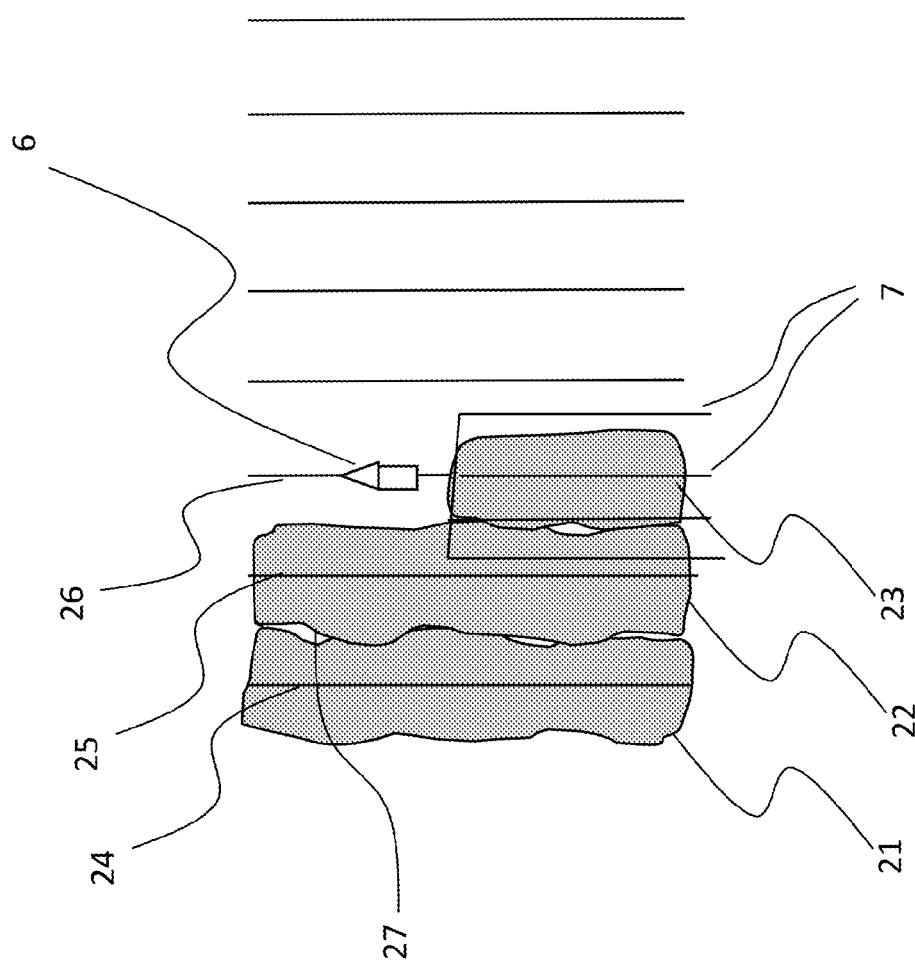

As already discussed in relation to FIG. 1, we consider a seismic vessel associated with a current sail line and a current preplot line (which are often the same). This seismic vessel tows one or several streamers (acoustic linear antennas) comprising receivers. These receivers receive signals generated by at least one source and reflected by the subsurface's layers, at reflexion points.

We assume that the receivers are divided in a plurality of offset classes (e.g. "near offsets", "near-mid offsets", "mid-far offsets", "mid offsets" and "far offsets").

In the particular embodiment discussed below, the input of the steering method are:
  a current sail line (the current preplot line is often the same as the current sail line);
  one or several known binning boundaries, e.g.:
    a first known binning boundary, which is the boundary of a binning coverage zone associated with a first previous preplot line. In a particular embodiment, the first previous preplot line is adjacent to the current preplot line (e.g. on the right of the current preplot line when considering the direction of the sail line). In an alternative embodiment, the first previous preplot line is not adjacent to the current preplot line;
    a second known binning boundary, which is the boundary of a binning coverage zone associated with a second previous preplot line. In a particular embodiment, the second previous preplot line is adjacent to the current preplot line (e.g. on the left of the current preplot line when considering the direction of the sail line). In an alternative embodiment, the second previous preplot line is not adjacent to the current preplot line;
  the positions $(x_i, y_i)$ of the reflexion points (which can be possibly extrapolated, i.e. computed anticipatively by extrapolation), e.g.:
    for each offset class, the positions of n first reflexion points of the external streamer relative to the first known binning boundary (i.e. the closest streamer to the first known binning boundary);
    for each offset class, the positions of n second reflexion points of the external streamer relative to the second known binning boundary (i.e. the closest streamer to the second known binning boundary).

An external streamer relative to a binning boundary is the closest streamer to this binning boundary, among a plurality of streamers towed by the seismic vessel.

The outputs of the steering method are steering information to alter the course of the vessel.

A binning boundary is a broken line, whose format is unspecified. The only requirement is to be able to compute a distance from a reflexion point to this broken line, and this distance shall be unique.

In step 51, the device selects one of the first and second previous preplot lines. Then for the selected previous preplot line, the device carries out steps 52 to 57.

In step 52, the device selects one of the offset classes. Then for the selected offset class, the device carries out steps 53 and 54.

In step 53, the device computes distances $d_i$, $i \in \{1 \ldots n\}$, from n reflexion points of the external streamer to a binning boundary of the binning coverage zone associated with the selected previous preplot line.

For example, if we assume the selected previous preplot line is the first previous preplot line, the distances $d_i$ are computed from the first reflexion points to the first known binning boundary.

In a particular implementation, the distances $d_i$ are directed distances having a positive value when the binning boundary is on the right of the reflexion points when considering the direction of the sail line.

In step 54, the device computes and stores a distance D, from the n reflexion points to n target reflexion points, as a function of the distances $d_i$.

The distance D is a constant directed distance having a positive value when the target reflexion points are on the right of the reflexion points when considering the direction of the sail line.

The distance D is computed so that a function f(X) is minimal, with $X=\{x_1, \ldots, x_n, D\}$ and $D=x_i+d_i$, $i \in \{1 \ldots n\}$.

Each of the distances $x_i$ is a directed distance from the binning boundary to one of the n target reflexion points, having a positive value when the target reflexion point is on the right of the binning boundary when considering the direction of the sail line.

In a particular embodiment, the function f(X) is defined as:

$$f: X \to \frac{1}{2} x^T \cdot x + \frac{1}{2} \varepsilon \cdot D^2$$

with $x = \{x_1, \ldots, x_n\}$ and $\varepsilon$ reduction coefficient minimizing the influence of $D^2$ (e.g. $\varepsilon$ is a small number, e.g.: $10^{-1} \leq \varepsilon \leq 10^{-12}$).

The problem is mathematically equivalent to minimise f(X) under the constraints AX=d, where d is a column matrix ($d=\{d_1, \ldots, d_n\}$), X is also is a column matrix ($X=\{x_1, \ldots, x_n, D\}$) and A is a matrix comprising an identity matrix $I_n$ multiplied by $-1$, and a (n+1)th column comprising n ones.

The unknown is X, i.e. the distances $x_i$ and the distance D.

For example, if n=2, we have two constraints:

$-x_1 + D = d_1$ $-x_2 + D = d_2$ and the equation AX=d is:

$$\begin{pmatrix} -1 & 0 & 1 \\ 0 & -1 & 1 \end{pmatrix} \begin{pmatrix} x_1 \\ x_2 \\ D \end{pmatrix} = \begin{pmatrix} d_1 \\ d_2 \end{pmatrix}$$

Hence the problem is solved as follows, using Lagrange parameters:

$$L(X) = f(X) + \mu^T (d - AX)$$

$$L(X) = \frac{1}{2} x^T x + \frac{1}{2} \varepsilon \cdot D^2 + \mu^T (d - AX),$$

where $\mu$ is the vector of the Lagrange parameters.

$$\frac{\partial L}{\partial X} = 0 \Rightarrow \tilde{X} = A^T \mu$$

$$\frac{\partial L}{\partial \mu} = 0 \Rightarrow d = AX$$

$$d = AX = AC^{-1} \tilde{X}, \text{ where } \tilde{X} = CX$$

with C a matrix (n+1,n+1) comprising: an identity matrix $I_n$, a (n+1)th line comprising n zeroes then $\varepsilon$, and a (n+1)th column comprising n zeroes then $\varepsilon$ For example, if n=2:

$$c = \begin{matrix} 1 & 0 & 0 \\ 0 & 1 & 0 \\ 0 & 0 & \varepsilon \end{matrix}$$

Hence $d = AC^{-1}\tilde{X} = AC^{-1}A^T \mu \Leftrightarrow \mu = (AC^{-1}A^T)^{-1} d$ And finally: $X = C^{-1} A^T (AC^{-1}A^T)^{-1} d$ In other words, the value of X, referred to as result $X_r$, which minimizes f(X) is computed as: $X_r = C^{-1} A^T (AC^{-1}A^T)^{-1} d$ From $X_r$, D is obtained (it is the last line).

In an alternative embodiment of step 54, at least one additional constraint is set and the process is slightly different. The at least one additional constraint is of the form $x_i \leq k$ or $x_i \geq K$, k and K being arbitrary real numbers. After the calculation described above is done, which gives the result $X_r$, the following supplemental steps are carried out:

verifying that the distances $x_i$ comprised in the result $X_r$ satisfy the at least one additional constraint;

if the at least one additional constraint is satisfied by the distances $x_i$ comprised in the result $X_r$, $X_r$ is retained as final result;

if the at least one additional constraint is not satisfied by at least one of the distances $x_i$ comprised in the result $X_r$:

(a) for each additional constraint, selecting one of the distances $x_i$, which does not satisfy this additional constraint. In a particular implementation, if the additional constraint is of the form $x_i \geq K$, the selected one of the distances $x_i$ is the one having an index i corresponding to max(di), and if the additional constraint is of the form $x_i \leq k$, the selected one of the distances $x_i$ is the one having an index i corresponding to min(di);

(b) for each additional constraint, adding a supplemental line in the matrix A (which thus becomes A'). Each supplemental line describes an equality constraint $x_i = k$ or $x_i = K$ corresponding to this additional constraint for the selected one of the distances $x_i$;

(c) computing a final result $X'_r$ defined as: $X'_r = A'^{-1} d$ if A' is squared, or $X'_r = (A'^T C^{-1} A')^{-1} A'^T C^{-1} d$ if A' has more rows than columns.

In an alternative embodiment of above step (a), the selected one of the distances $x_i$ is not corresponding to max(di) or min(di). Then, steps (a), (b) and (c) are carried out iteratively (each iteration with one of the distances $x_i$ which do not satisfy the at least one additional constraint), until a final result $X'_r$ comprises distances $x'_i$ all satisfying the at least one additional constraint.

Let's take again the example with n=2 and the following two constraints:

$$-x_1+D=d_1$$

$$-x_2+D=d_2$$

and we assume the following equality constraint is added:

$$x_2=k$$

Then the equation A'X=d is:

$$\begin{pmatrix} -1 & 0 & 1 \\ 0 & -1 & 1 \\ 0 & 1 & 0 \end{pmatrix} \begin{pmatrix} x_1 \\ x_2 \\ D \end{pmatrix} = \begin{pmatrix} d_1 \\ d_2 \\ k \end{pmatrix}$$

A more detailed example of the alternative embodiment of step 54 is given below, in relation to FIGS. 7A and 7B.

Steps 55 and 56 allow to repeat the process of steps 53 and 54 for each offset class. In step 55, the device checks whether all the offset classes have already been selected. If all the offset classes have already been selected, the process goes to step 57. Otherwise, it goes to step 56, in which the device selects another offset class, not yet selected.

In step 57, the device computes a final distance $D_f$ on the basis of the distances D computed for the different offset classes. $D_f$ is for example a weighted average of these distances D (i.e. a weighted average over the offset classes).

Steps 58 and 59 allow to repeat the process of steps 52 to 57 for each previous preplot line. In step 58, the device checks whether all the previous preplot lines have already been selected. If all the previous preplot lines have already been selected, the process goes to step 510. Otherwise, it goes to step 59, in which the device selects another previous preplot line, not yet selected.

In step 510, the device computes a resulting distance $D_r$ on the basis of the final distances $D_f$ computed for the different previous preplot lines. $D_r$ is for example a weighted average of these final distances $D_f$ (i.e. a weighted average over the previous preplot lines).

In step 511, the device provides steering information comprising, or based on, the resulting distance $D_r$ to a navigation system or to an operator of a navigation system, to alter the course of the seismic vessel. In other words, the vessel is controlled (either automatically or by suggestion to an operator) by the steering information.

In a particular embodiment, the steering information comprise:
 a directed distance DC from the sail line to a current position of the seismic vessel, having a positive value when the seismic vessel is on the right of the sail line, when considering the direction of the sail line; and
 a desired track offset DTO, which is a directed distance from the sail line to a desired position of the seismic vessel, having a positive value when the seismic vessel is on the right of the sail line when considering the direction of the sail line, DTO being defined as follows: DTO=DC+$D_r$.

Figure 3:
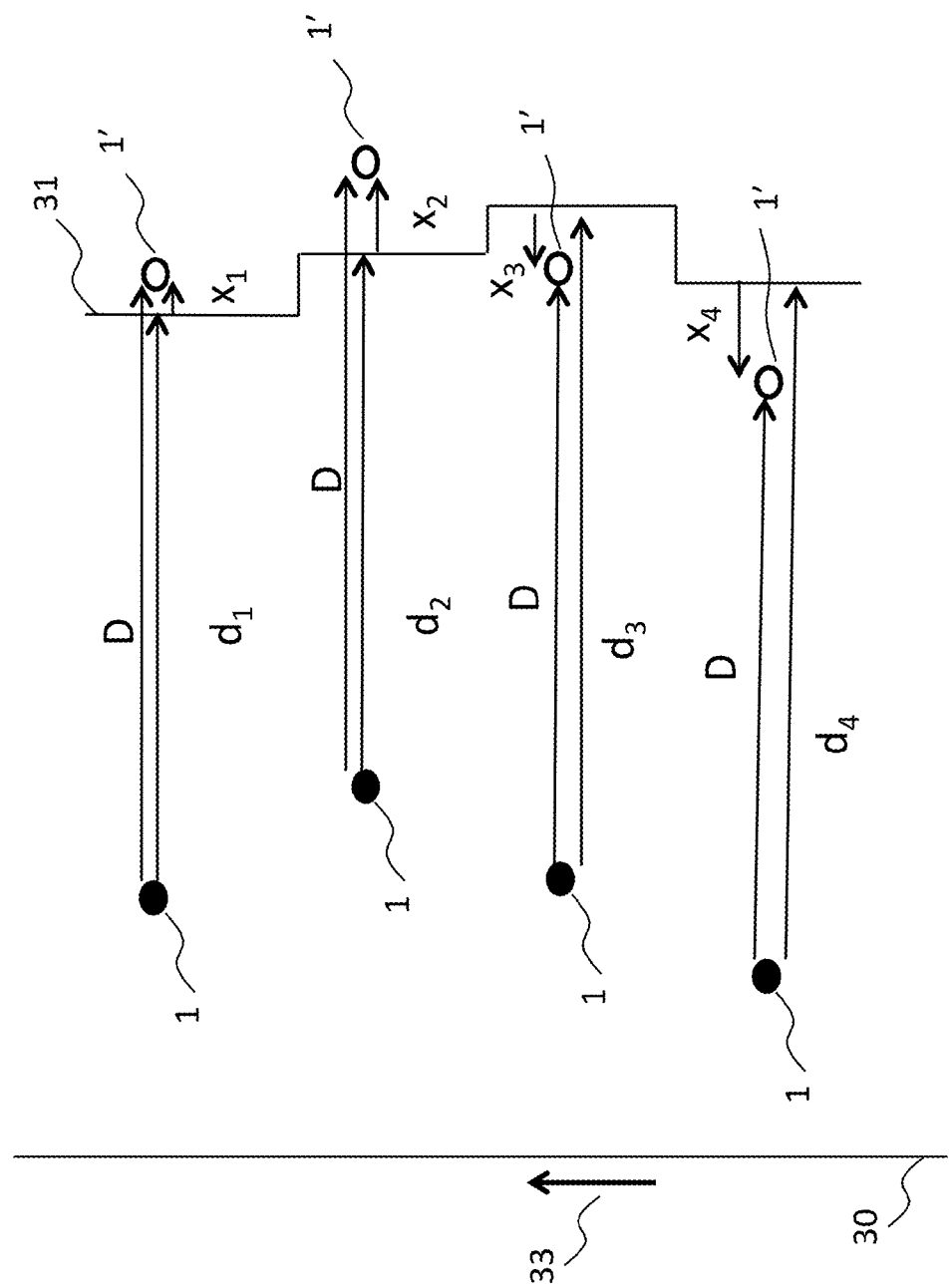
FIG. 3 illustrates the idea of the proposed solution.

FIG. 3 illustrates the idea of the proposed solution.

The current sail line is referenced 30, having a direction symbolized by the arrow referenced 33.

A binning boundary (of the binning coverage zone associated with a previous preplot line) is shown and referenced 31.

The reflexion points are represented as black discs and referenced 1. The target reflexion points are represented as black circles and referenced 1'.

Four distances $d_i$ ($d_1$, $d_2$, $d_3$ and $d_4$) and four distances $x_i$ ($x_1$, $x_2$, $x_3$ and $x_4$) are shown.

The distance D (directed distance from the reflexion points 1 to the target reflexion points 1') is shown. In this example, D has a positive value, considering the above sign convention (D has a positive value when the target reflexion points are on the right of the reflexion points when considering the direction (see arrow referenced 33) of the sail line 30).

FIGS. 6A and 6B show a vessel before (FIG. 6A) and after (FIG. 6B) modification of the course of the vessel 6, according to the proposed solution.

As in FIG. 3, the current sail line is referenced 30, the known binning boundary is referenced 31, the reflexion points are represented as black discs and referenced 1, and the target reflexion points are represented as black circles and referenced 1'.

In FIG. 6A (i.e. before modification of the course of the vessel 6), the following distances are shown:
 the resulting distance $D_r$ (from the reflexion points 1 to the target reflexion points 1') is shown. In this example, $D_r$ has a posititive value, considering the above sign convention;
 the distance DC is shown (directed distance from the sail line 30 to a current position of the seismic vessel 6). In this example, DC has a positive value, considering the above sign convention (DC has a positive value when the seismic vessel is on the right of the sail line, when considering the direction (see arrow referenced 33) of the sail line); and
 the desired track offset DTO (directed distance from the sail line to a desired position of the seismic vessel 6). In this example, DTO has a positive value, considering the above sign convention (DTO has a positive value when the seismic vessel is on the right of the sail line when considering the direction (see arrow referenced 33) of the sail line). DTO is defined as follows: DTO=DC+$D_r$.

In FIG. 6B, i.e. after modification of the course of the vessel 6, we can see that the vessel 6 has reached the desired position: the distance from the sail line to the current position of the seismic vessel 6 is equal to DTO. In other words, we have DTO=DC, and compared to FIG. 6A, the vessel has moved (of the distance $D_r$) towards the known binning boundary referenced 31. Thus, the binning coverage zone associated with the current preplot line is juxtaposed with the binning coverage zone associated with the previous preplot line.

FIGS. 7A and 7B illustrate the difference between a case without use of an additional constraint (FIG. 7A) and a case with use of an additional constraint (FIG. 7B), this additional constraint preventing some bins to be over-covered, in a particular embodiment of the method according to the disclosure. This is a more detailed example of the alternative embodiment of step 54.

In FIG. 7A, we assume there is no additional constraint.

In this example, n=3, therefore we have the following three constraints:

$$-x_1+D=d_1$$

$$-x_2+D=d_2$$

$$-x_3+D=d_3$$

We assume the device computes the distances and obtains: $d_1$=5, $d_2$=6 and $d_3$=7.

Then the equation AX=d is:

$$\begin{pmatrix} -1 & 0 & 0 & 1 \\ 0 & -1 & 0 & 1 \\ 0 & 0 & -1 & 1 \end{pmatrix} \begin{pmatrix} x_1 \\ x_2 \\ x_3 \\ D \end{pmatrix} = \begin{pmatrix} d_1 \\ d_2 \\ d_3 \end{pmatrix}$$

From $X_r = C^{-1}A^T(AC^{-1}A^T)^{-1}d$, we obtain:

$$X_r = \begin{pmatrix} 1 \\ 0 \\ -1 \\ 6 \end{pmatrix}$$

This result $X_r$ is illustrated by FIG. 7A: $x_1=1$, $x_2=0$, $x_3=-1$ and D=6.

In FIG. 7B, we assume there is one additional constraint of the form $x_i \le 0$, i.e. k=0.

The distance $x_1$ comprised in the result $X_r$ doesn't satisfy the additional constraint. Therefore $X_r$ is not retained as final result and the following steps are carried out:

selecting $x_1$ (in this example this selection is easy since it is the only distance $x_1$ which does not satisfy the additional constraint;
 to describe an equality constraint $x_1=0$, a supplemental line is added in the matrix A, which thus becomes A' a square matrix (4,4). The equation A'X=d is:

$$\begin{pmatrix} -1 & 0 & 0 & 1 \\ 0 & -1 & 0 & 1 \\ 0 & 0 & -1 & 1 \\ 1 & 0 & 0 & 0 \end{pmatrix} \begin{pmatrix} x_1 \\ x_2 \\ x_3 \\ D \end{pmatrix} = \begin{pmatrix} d_1 \\ d_2 \\ d_3 \\ 0 \end{pmatrix}$$

From $X'_r = A'^{-1}d$ we obtain:

$$X'_r = \begin{pmatrix} 0 \\ -1 \\ -2 \\ 5 \end{pmatrix}$$

This final result $X'_r$ is illustrated by FIG. 7B: $x_1=0$, $x_2=-1$, $x_3=-2$ and D=5.

With this final result, the additional constraint is satisfied by all distances $x_i$, including $x_1$. Therefore, there is no bin over-covered.

FIG. 4 shows the simplified structure of a device (machine) according to a particular embodiment of the disclosure, which carries out the method shown in FIG. 5 for example. This device is comprised for example in the vessel (e.g. in the integrated navigation system INS).

The device 40 comprises a non-volatile memory 41 (e.g. a read-only memory (ROM) or a hard disk), a volatile memory 43 (e.g. a random access memory or RAM) and a processor 42. The non-volatile memory 41 is a non-transitory computer-readable carrier medium. It stores executable program code instructions, which are executed by the processor 42 in order to enable implementation of the method described above with FIG. 5.

Upon initialization, the aforementioned program code instructions are transferred from the non-volatile memory 41 to the volatile memory 43 so as to be executed by the processor 42. The volatile memory 43 likewise includes registers for storing the variables and parameters required for this execution.

The devices receives as inputs the current sail line 44a, the positions of the reflexion points 44b, and the known binning boundaries 44c. It generates as output steering information, e.g. the desired track offset (DTO) 45a and the distance DC 45b described above.

All the steps of the above steering method can be implemented equally well:

by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or
 by a dedicated machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it can also be implemented in hardware form or any form combining a hardware portion and a software portion.

At least one embodiment of the disclosure provides a steering technique applicable to a seismic vessel, enabling to perform an efficient global coverage.

At least one embodiment of the disclosure provides a technique of this kind enabling to obtain steering information (e.g. a steering offset (DTO)) automatically, without intervention of a human operator (navigator).

At least one embodiment of the disclosure provides a technique of this kind that is simple to implement and inexpensive.

Although the present disclosure has been described with reference to one or more examples, workers skilled in the art will recognize that changes may be made in form and detail without departing from the scope of the disclosure and/or the appended claims.

The invention claimed is:

1. A method for steering a seismic vessel associated with a sail line and a current preplot line, said seismic vessel towing at least one acoustic linear antenna comprising receivers, said receivers receiving signals generated by at least one source and reflected by subsurface's layers at a plurality of reflexion points, comprising the following acts performed by a computer processor:

a) computing distances $d_i$, $i \in \{1 \ldots n\}$, from n reflexion points, included in said plurality of reflexion points, to a boundary of an already obtained binning coverage zone associated with an already used previous preplot line;

b) computing a distance D, from said n reflexion points to n target reflexion points, as a function of said distances $d_i$; and c) providing steering information comprising or based on the distance D to a navigation system or to an operator of a navigation system, to alter the course of the seismic vessel.

2. The method according to claim 1, wherein said previous preplot line is adjacent to said current preplot line.

3. The method according to claim 1, wherein said n reflexion points are reflexion points associated with an external acoustic linear antenna, which is the closest acoustic linear antenna to said boundary among a plurality of acoustic linear antennas towed by said seismic vessel.

4. The method according to claim 1, wherein said distances $d_i$ are directed distances having a positive value when said boundary is on the right of the reflexion points when considering the direction of the sail line, and wherein said distance D is a constant directed distance having a positive value when the target reflexion points are on the right of the reflexion points when considering the direction of the sail line, and so that a function f(X) is minimal, with $X=\{x_1, \ldots, x_n, D\}$, said distance D being defined as: $D=x_i+d_i$, $i \in \{1 \ldots n\}$ and, each of the distances $x_i$ being a directed distance from said boundary to one of the n target reflexion points, having a positive value when said target reflexion point is on the right of said boundary when considering the direction of the sail line.

5. The method according to claim 4, wherein the function f(X) is defined as:

$$f: X \to \frac{1}{2} x^T \cdot x + \frac{1}{2} \varepsilon \cdot D^2,$$

with $x=\{x_1, \ldots, x_n\}$ and $\varepsilon$ a reduction coefficient minimizing the influence of $D^2$.

6. The method according to claim 5, wherein the value of X, referred to as result $X_r$, which minimizes f(X) is computed in step b) as: $X_r = C^{-1} A^T (AC^{-1}A^T)^{-1} d$, with:
   d a column matrix comprising the distances $d_i$, $i \in \{1 \ldots n\}$;
   C a matrix (n+1,n+1) comprising: an identity matrix $I_n$, a (n+1)th line comprising n zeroes then $\varepsilon$, and a (n+1)th column comprising n zeroes then $\varepsilon$; and
   A a matrix (n,n+1) such that: AX=d, i.e. A defining n constraints: $-x_i+D=d_i$, $i \in \{1 \ldots n\}$ and comprising: an identity matrix $I_n$ multiplied by $-1$, and a (n+1)th column comprising n ones.

7. The method according to claim 6, wherein at least one additional constraint is set, of the form $x_i \leq k$ or $x_i \geq K$, k and K being arbitrary real numbers, and wherein said step b) comprises the following supplemental steps:
   verifying that the distances $x_i$ comprised in the result $X_r$ satisfy said at least one additional constraint;
   if said at least one additional constraint is satisfied by the distances $x_i$ comprised in the result $X_r$, $X_r$ is retained as final result;
   if said at least one additional constraint is not satisfied by at least one of the distances $x_i$ comprised in the result $X_r$:
      for each additional constraint, selecting one of the distances $x_i$, which does not satisfy said additional constraint;
      for each additional constraint, adding a supplemental line in said matrix A, which thus becomes A', each supplemental line describing an equality constraint $x_i = k$ or $x_i = K$ corresponding to said additional constraint for the selected one of the distances $x_i$;
      computing a final result $X'_r$ defined as: $X'_r = A'^{-1} d$ if A' is squared, or $X'_r = (A'^T C^{-1} A')^{-1} A'^T C^{-1} d$ if A' has more rows than columns.

8. The method according to claim 7, wherein, if the additional constraint is of the form $x_i \geq K$, the selected one of the distances $x_i$ is the one having an index i corresponding to max(di), and wherein, if the additional constraint is of the form $x_i \leq k$, the selected one of the distances $x_i$ is the one having an index i corresponding to min(di).

9. The method according to claim 1, wherein the steering information comprise:
   a directed distance DC from the sail line to a current position of the seismic vessel, having a positive value when the seismic vessel is on the right of the sail line, when considering the direction of the sail line; and
   a desired track offset DTO, which is a directed distance from the sail line to a desired position of the seismic vessel, having a positive value when the seismic vessel is on the right of the sail line when considering the direction of the sail line, DTO being defined as follows: DTO=DC+D.

10. The method according to claim 1, wherein said n reflexion points are reflexion points associated with an acoustic linear antenna towed by said seismic vessel and comprising receivers, said receivers receiving signals generated by at least one source and reflected by subsurface's layers of the sea at said n reflexion points,
   wherein the receivers are divided in a plurality of offset classes,
   wherein said steps a) and b) are carried out for at least two offset classes of said plurality, a distance D being computed for each offset class,
   wherein the method comprises a step b') of computing a final distance $D_f$ on the basis of the distances D computed for said at least two offset classes,
   and wherein in said step c) the steering information comprise, or are based, on the final distance $D_f$.

11. The method according to claim 1, wherein said steps a) and b) are carried out for at least two previous preplot lines, a distance D being computed for each previous preplot line,
   wherein the method comprises a step b") of computing a resulting distance $D_r$ on the basis of the distances D computed for said at least two previous preplot lines,
   and wherein in said step c) the steering information comprise, or are based, on the resulting distance $D_r$.

12. The method according to claim 11, wherein, for each of said for at least two previous preplot lines:
   said steps a) and b) are carried out for each of said at least two offset classes, and
   said step b') is carried out, enabling to output the final distance $D_f$ on the basis of the distances D computed for said at least two offset classes,
   and wherein in said step b"), the resulting distance $D_r$ is computed on the basis of the final distance $D_f$ computed for said at least two previous preplot lines.

13. A non-transitory computer-readable carrier medium storing a computer program comprising program code instructions which, when executed on a computer or a processor, allow to implement a method for steering a seismic vessel associated with a sail line and a current preplot line, said seismic vessel towing at least one acoustic linear antenna comprising receivers, said receivers receiving signals generated by at least one source and reflected by subsurface's layers at a plurality of reflexion points, said method comprising:
   a) computing distances $d_i$, $i \in \{1 \ldots n\}$, from n reflexion points, included in said plurality of reflexion points, to a boundary of an already obtained binning coverage zone associated with an already used previous preplot line;
   b) computing a distance D, from said n reflexion points to n target reflexion points, as a function of said distances $d_i$; and
   c) providing steering information comprising or based on the distance D to a navigation system or to an operator of a navigation system, to alter the course of the seismic vessel.

14. A device for steering a seismic vessel associated with a sail line and a current preplot line, said seismic vessel towing at least one acoustic linear antenna comprising receivers, said receivers receiving signals generated by at least one source and reflected by subsurface's layers at a plurality of reflexion points, said device being configured to:

- compute distances $d_i$, $i \in \{1 \ldots n\}$, from n reflexion points, included in said plurality of reflexion points, to a boundary of an already obtained binning coverage zone associated with an already used previous preplot line;
- compute a distance D, from said n reflexion points to n target reflexion points, as a function of said distances $d_i$; and
- provide steering information comprising or based on the distance D to a navigation system or to an operator of a navigation system, to alter the course of the seismic vessel.

* * * * *